(No Model.)
G. McCAULEY & B. J. CADY.
Filter.
No. 231,494. Patented Aug. 24, 1880.
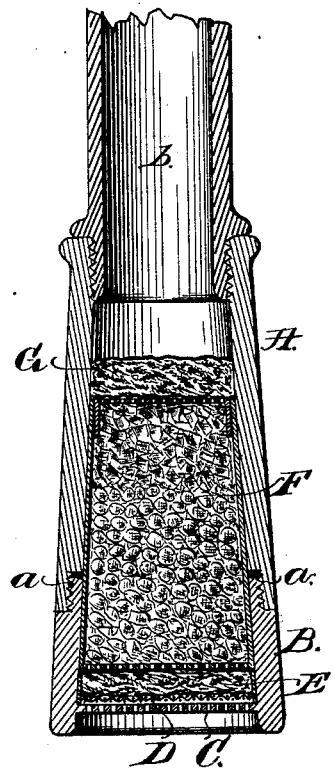
WITNESSES
INVENTOR
George McCauly
Benjamin J. Cady
ATTORNEY

UNITED STATES PATENT OFFICE.

GEORGE McCAULEY AND BENJAMIN J. CADY, OF WASHINGTON, D. C.

FILTER.

SPECIFICATION forming part of Letters Patent No. 231,494, dated August 24, 1880.

Application filed April 10, 1880. (No model.)

*To all whom it may concern:*

Be it known that we, GEORGE MCCAULEY and BENJAMIN J. CADY, citizens of the United States, residing at Washington, District of Columbia, have invented new and useful Improvements in Filters, of which the following is a specification.

Our invention relates to certain improvements in filters. It has for its object to so construct and arrange the several parts that it may be readily secured in position upon an ordinary faucet, and be capable of such dismemberment as to facilitate the cleaning of the several parts; and with these ends in view our invention consists of a filter composed of a shell made up of two or more sections connected by screw-threads, the upper end being threaded to adapt it to be secured to a faucet, and the lower end provided with a perforated diaphragm in combination with an interior removable filtering-casket and two or more sponges, as will be hereinafter and in detail explained.

In the drawing we have shown a central vertical section of a filter embodying the features of our invention.

The tube or case which incloses the filtering material is composed of two sections, A B, which are coupled by means of screw-threads $a$. The lower section, B, has formed with or attached thereto a perforated diaphragm or bottom, C, and the upper section, A, has a thread cut interiorly, as clearly shown, in order that it may be readily secured to the ordinary hydrant or screw faucet $b$. We prefer to taper the sides of the case, as shown, in order that increased filtering-surface may be obtained.

D is a woven-wire cup, in which is arranged a sponge, E, which is designed to arrest the escape of any of the filtering material, which is arranged in any desirable manner within a casket, F, having a perforated top and bottom, and which may be made in sections, so that it may be opened to reload, &c. This casket F is of such shape and dimensions that it may be readily removed bodily from the case when the latter is opened.

G is a sponge arranged within the case and on top of the filter-casket F. This sponge G may be simply dropped in at the top, or it may be secured in place by an inverted woven-wire cup similar to that shown at D.

It will be observed that the device when secured in position as shown confines the filtering devices securely in place, and that the liquid flowing from $b$ is partially cleansed by passing through the primary sponge G. It then passes through and is acted upon by the filtering material contained within the casket F, and is finally cleansed by the sponge E, which latter also serves to arrest any of the filtering material which might otherwise possibly escape from the casket F. At any time when the device may become foul or inoperative from long use it is only necessary to remove the lower section, B, and extract the sponges and casket, and thoroughly wash and clean the same, and if the filtering material shall have become deteriorated the casket may be reloaded.

What we claim as new, and desire to secure by Letters Patent, is—

The filter-case made in two sections, joined in the manner described, and having lower end perforated, in combination with the interior removable casket, F, filled with filtering material and having its two ends perforated, whereby the parts may be separated and the filtering material at the same time be kept intact, substantially as and for the purpose set forth.

In testimony whereof we have hereunto set our hands in the presence of two subscribing witnesses.

GEO. McCAULEY.
BENJAMIN J. CADY.

Witnesses:
M. M. ROHRER,
F. W. SMITH, Jr.